No. 780,128. Patented January 17, 1905.

UNITED STATES PATENT OFFICE.

FRANK A. REYNOLDS, OF LEWISTON, MAINE, ASSIGNOR TO STEPHEN H. MANNING, OF LEWISTON, MAINE, AND HERSCHELL C. PARKER, OF NEW YORK, N. Y.

BRAZING COMPOUND.

SPECIFICATION forming part of Letters Patent No. 780,128, dated January 17, 1905.

Application filed August 5, 1904. Serial No. 219,585.

*To all whom it may concern:*

Be it known that I, FRANK A. REYNOLDS, of Lewiston, in the county of Androscoggin and State of Maine, have invented a new and Improved Brazing Compound, of which the following is a full, clear, and exact description.

My invention relates to improvements in brazing iron; and the object of my invention is to produce a simple composition by means of which cast-iron or other iron can be cheaply, easily, and strongly welded or united.

My invention is based on the well-known reducing properties of aluminium, and I use this in some form as a means for absorbing the oxygen in the parts to be mended and for forming an alloy which serves as a very perfect spelter.

In carrying out my invention in one simple manner I take aluminium powder and mingle it with about equal parts of carbon. These materials I mix with oil or water, so as to form a paste. This paste can be used for painting the ends of the parts to be united, after which these ends are placed in the fire and heated to a red heat. After this borax and the ordinary brazing compound or spelter can be melted on over the joint and allowed to cool. These parts are then filed off, as usual. The aluminium has so great an affinity for oxygen that it reduces all other oxids present and leaves an absolutely metallic surface at the parts which are to be united, so that there is nothing to prevent a perfect union.

For general purposes I prefer to use the aluminium with other compounds in stick form, as it can be very conveniently used in this way. In carrying out this idea I take the ordinary spelter or brazing mixture, a quantity of aluminium powder, and some oxid of iron, together with a little copper to toughen the material. This mixture is then heated up to a red heat, when it melts down and forms an alloy. This action is greatly facilitated by the presence of the aluminium and oxid of iron. The aluminium takes the oxygen from the oxid of iron, thus producing a great amount of extra heat, and so the mixture is readily fused and an alloy is produced composed of the original spelter, iron, and a slight excess of aluminium and copper. This alloy in the form of sticks or other form is then applied directly to the heated ends of the parts to be brazed, which require no previous preparation. The action of the brazing is probably due to the presence of the iron in the alloy, as it is well known that this has an affinity for the iron ends to be brazed, and also to the reducing and solvent action of the aluminium in the mixture described. In forming this alloy about equal parts of spelter, oxid of iron, aluminium, and copper are used; but these proportions can be varied to meet varying conditions.

It will be noticed that while the compositions which I have described vary somewhat still the feature of both is the aluminium, and it is this agent which makes the action perfect.

Having thus fully described my invention, I claim as new and desire to secure by Letters Patent—

1. The herein-described brazing compound, consisting of aluminium, an oxid and copper combined as stated.

2. The herein-described brazing compound, comprising spelter, copper, aluminium and an oxid combined as stated.

3. The herein-described brazing compound, comprising aluminium, spelter, oxid of iron and copper, in substantially the proportions stated.

4. The herein-described brazing compound, consisting of an alloy formed of spelter, iron oxid, aluminium and copper, the said ingredients being combined and melted.

FRANK A. REYNOLDS.

Witnesses:
E. P. DAVIS,
W. H. PUTNAM.

It is hereby certified that Letters Patent No. 780,128, granted January 17, 1905, upon the application of Frank A. Reynolds, of Lewiston, Maine, for an improvement in "Brazing Compounds," was erroneously issued to "Stephen H. Manning and Herschell C. Parker" as owners of the entire interest, whereas said Letters Patent should have been issued to said *Frank A. Reynolds, Stephen H. Manning and Herschel C. Parker, jointly*, the three being joint owners of said invention as shown by the record of assignments in this office; and that the given name of the last-mentioned assignee should have been spelled *Herschel* instead of "Herschell;" and that the said Letters Patent should be read with these corrections therein that the same may conform to the record of the case in the Patent Office.

Signed and sealed this 31st day of January, A. D., 1905.

[SEAL.]

F. I. ALLEN,
*Commissioner of Patents.*